US012093576B2

(12) United States Patent
Tylik et al.

(10) Patent No.: US 12,093,576 B2
(45) Date of Patent: Sep. 17, 2024

(54) METRO CLUSTER FOR VIRTUAL VOLUMES

(71) Applicant: EMC IP Holding Company LLC, Hopkinton, MA (US)

(72) Inventors: Dmitry Nikolayevich Tylik, Westborough, MA (US); Alexey Vladimirovich Shusharin, Saint Petersburg (RU); Mark J. Halstead, Holliston, MA (US); Michael Specht, North Conway, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 303 days.

(21) Appl. No.: 17/155,381

(22) Filed: Jan. 22, 2021

(65) Prior Publication Data

US 2022/0236923 A1    Jul. 28, 2022

(51) Int. Cl.
*G06F 3/06* (2006.01)

(52) U.S. Cl.
CPC .......... *G06F 3/0665* (2013.01); *G06F 3/0604* (2013.01); *G06F 3/065* (2013.01); *G06F 3/067* (2013.01); *G06F 3/0689* (2013.01)

(58) Field of Classification Search
CPC ...... G06F 3/0665; G06F 3/0604; G06F 3/065; G06F 3/067; G06F 3/0689
See application file for complete search history.

(56) References Cited

U.S. PATENT DOCUMENTS

| 9,933,957 | B1 | | 4/2018 | Cohen et al. | |
|---|---|---|---|---|---|
| 9,940,155 | B1 | | 4/2018 | Lee et al. | |
| 9,983,896 | B1 | | 5/2018 | Naik et al. | |
| 9,992,282 | B1 | * | 6/2018 | Degwekar | H04L 69/40 |
| 10,019,272 | B1 | * | 7/2018 | Mahapatra | G06F 9/45533 |
| 10,678,576 | B1 | | 6/2020 | Taylor et al. | |
| 10,768,837 | B2 | | 9/2020 | Tylik et al. | |
| 2008/0109601 | A1 | * | 5/2008 | Klemm | G06F 3/0647 |
| | | | | | 711/E12.001 |
| 2012/0089804 | A1 | * | 4/2012 | Ikegaya | G06F 3/0689 |
| | | | | | 711/171 |
| 2013/0055249 | A1 | * | 2/2013 | Vaghani | G06F 9/45558 |
| | | | | | 718/1 |
| 2013/0212345 | A1 | * | 8/2013 | Nakajima | G06F 3/0605 |
| | | | | | 711/161 |
| 2017/0131920 | A1 | * | 5/2017 | Oshins | G06F 3/0658 |

(Continued)

OTHER PUBLICATIONS

Dell EMC SRDF, Introduction, Rev 01, Sep. 2019 (Year: 2019).*

(Continued)

*Primary Examiner* — Khoa D Doan
*Assistant Examiner* — Edmund H Kwong
(74) *Attorney, Agent, or Firm* — BainwoodHuang

(57) ABSTRACT

A technique for deploying virtual volumes in a metro cluster across first and second arrays includes impersonating a third array that purports to host single-site virtual volumes. The technique further includes mapping the single-site virtual volumes purportedly hosted by the third array to respective pairs of actual virtual volumes. Each pair includes a first virtual volume in the first array and a second virtual volume in the second array and realizes a stretched virtual volume, with writes being mirrored between the virtual volumes of each pair.

22 Claims, 5 Drawing Sheets

(56) References Cited

U.S. PATENT DOCUMENTS

2019/0354296 A1* 11/2019 MacIntosh ............ G06F 3/0631
2022/0066807 A1* 3/2022 Kashyap ............... G06F 3/0631

OTHER PUBLICATIONS

VMware vSphere, Product Documentation, Binding and Unbinding Virtual Volumes to Protocol Endpoints, Sep. 26, 2019, https://docs.vmware.com/en/VMware-vSphere/7.0/com.vmware.vsphere.storage.doc/GUID-FFE180BE-3453-413D-80D2-D79E6BBAAB75.html (Year: 2019).*

Hogan, Cormac, A closer look at EMC ViPR, cormachogan.com Storage, Virtualization, Container Orchestration, Nov. 4, 2013 https://cormachogan.com/2013/11/04/a-closer-look-at-emc-vipr/ (Year: 2013).*

* cited by examiner

METRO CLUSTER FOR VIRTUAL VOLUMES

BACKGROUND

Data storage systems are arrangements of hardware and software in which storage processors are coupled to arrays of non-volatile storage devices, such as magnetic disk drives, electronic flash drives, and/or optical drives. The storage processors service storage requests, arriving from host machines ("hosts"), which specify blocks, files, and/or other data elements to be written, read, created, deleted, and so forth. Software running on the storage processors manages incoming storage requests and performs various data processing tasks to organize and secure the data elements on the non-volatile storage devices.

Data storage systems, also known as "arrays," often arrange their data in metro clusters. "Metro clusters" are storage deployments in which two volumes hosted from respective arrays are synchronized and made to appear as a single volume to application hosts. Such volumes are sometimes referred to as "stretched" because they appear to extend between two arrays. Arrays participating in metro clusters can typically be separated by up to 100 km. Primary use cases for metro cluster include increased data availability, disaster avoidance, resource balancing across datacenters, and storage migration.

Metro-cluster deployments have long been available for LUNs (Logical UNits) and for certain file systems. For example, VMFS (developed by VMware, Inc. of Palo Alto, CA) is a clustered file system that presents a single file system image across distance. A typical VMFS deployment stores the data of multiple virtual machine disks as respective files (e.g., VMDK files). The VMFS instance itself is deployed over a LUN, and that LUN may be a stretched LUN in a metro cluster.

SUMMARY

Recent advances in virtual-machine technology have attempted to implement virtual-machine disks as independent storage entities, which storage systems can manage individually, rather than as files in a file system. For example, rather than providing a VMDK as one of hundreds of VMDK files that reside in a VMFS instance deployed over a LUN, where the LUN (and thus all of its VMDK files) is managed as a single entity, each virtual machine disk is instead made available as its own separately manageable entity, known as a vVol (virtual volume). Storage systems can treat vVols much the same way they treat LUNs, e.g., for purposes of replication, migration, and the like.

Unfortunately, there is no current solution for implementing metro cluster on vVols. Unlike conventional LUNs, which can be managed entirely by a storage system, vVols are subject to dual management by both the storage system and a virtual machine administrator, such as VMware's vCenter. However, neither vCenter nor any other known virtual machine environment manager is capable of stretching a virtual volume between arrays.

To address this deficiency at least in part, an improved technique for deploying virtual volumes in a metro cluster across first and second arrays includes impersonating a third array that purports to host single-site virtual volumes. The technique further includes mapping the single-site virtual volumes purportedly hosted by the third array to respective pairs of actual virtual volumes. Each pair includes a first virtual volume in the first array and a second virtual volume in the second array and realizes a stretched virtual volume, with writes being mirrored between the virtual volumes of each pair. Metro clustering of virtual volumes is thus achieved, with the associated benefits, such as increased data availability, disaster avoidance, resource balancing, and storage migration.

Certain embodiments are directed to a method of deploying virtual volumes in a metro cluster involving a first array and a second array. The method includes operating a software component that impersonates a third array for hosting single-site virtual volumes, the third array and the single-site virtual volumes of the third array existing virtually but not physically. The method further includes transforming, by the software component, a single-site virtual volume hosted by the third array to first and second virtual volumes hosted by the first and second arrays, respectively, such that the first and second virtual volumes form a stretched virtual volume corresponding to the single-site virtual volume. The method still further includes configuring mirroring between the first virtual volume and the second virtual volume to maintain data consistency therebetween.

In some examples, the software component is operatively coupled to a VMAM (virtual machine administrative manager) configured to administer single-site virtual volumes, and the method further includes mapping a command from the VMAM pertaining to the single-site virtual volume to corresponding instructions pertaining to the first and second virtual volumes.

In some examples, the method further includes creating a stretched storage container that spans between the first array and the second array, the stretched storage container including a first storage container operating in the first array and a second storage container operating in the second array, the first storage container and the second storage container having a common identifier.

In some examples, the method further includes, in response to creating a new virtual volume in the stretched container, implementing the new virtual volume as a stretched virtual volume having a first instance in the first array and a second instance in the second array.

In some examples, creating the new virtual volume is performed in response to the software component receiving a command from the VMAM to create a new virtual volume.

In some examples, creating the new virtual volume in the stretched container includes configuring the first instance in the first array and the second instance in the second array with a common virtual-volume identifier, such that the first instance and the second instance share the same virtual-volume identifier.

In some examples, the method further includes, in response to creating another virtual volume outside the stretched container, implementing the other virtual volume as an un-stretched virtual volume that exists in only one of the first array or the second array.

According to some examples, the first and second virtual volumes are deployed with uniform host connectivity, such that a host has access to both virtual volumes of the stretched virtual volume in the respective arrays.

According to some examples, the method further includes establishing a first protocol endpoint (PE) in the first array for enabling host access to the first virtual volume, establishing a second PE in the second array for enabling host access to the second virtual volume, and providing a shared identifier for both the first PE and the second PE, such that the first PE and the second PE form a stretched PE that appears as a single PE to hosts.

According to some examples, the method further includes the first array exposing the stretched PE to the host as ALUA (Asymmetric Logical Unit Access) active optimized, and the second array exposing the stretched PE to the host as ALUA active non-optimized.

According to some examples, the first and second virtual volumes are deployed with non-uniform host connectivity, such that a host has access to the first virtual volume in the first array but not to the second virtual volume in the second array.

According to some examples, the method further includes binding the first virtual volume in the first array to a first protocol endpoint (PE), binding the second virtual volume in the second array to a second PE, and providing the first PE and the second PE with respective identifiers that are different from each other.

Other embodiments are directed to a computerized apparatus constructed and arranged to perform a method of deploying virtual volumes in a metro cluster, such as the method described above. Still other embodiments are directed to a computer program product. The computer program product stores instructions which, when executed on control circuitry of a computerized apparatus, cause the computerized apparatus to perform a method of deploying virtual volumes in a metro cluster, such as the method described above.

Still other embodiments are directed to a method of deploying virtual volumes in a metro cluster involving a first array and a second array. The method includes forming a stretched storage container between the first array and the second array at least in part by assigning a first common identifier to both a first storage container in the first array and a second storage container in the second array. The method further includes forming a stretched virtual volume in the stretched storage container between the first array and the second array at least in part by assigning a second common identifier to both a first virtual volume in the first storage container and a second virtual volume in the second storage container. The method still further includes exposing the first virtual volume and the second virtual volume of the stretched virtual volume via respective protocol endpoints to one or more hosts.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

DETAILED DESCRIPTION

Embodiments of the improved technique will now be described. One should appreciate that such embodiments are provided by way of example to illustrate certain features and principles but are not intended to be limiting.

An improved technique for deploying virtual volumes in a metro cluster across first and second arrays includes impersonating a third array that purports to host single-site virtual volumes. The technique further includes mapping the single-site virtual volumes purportedly hosted by the third array to respective pairs of actual virtual volumes. Each pair includes a first virtual volume in the first array and a second virtual volume in the second array and realizes a stretched virtual volume, with writes being mirrored between the virtual volumes of each pair.

Figure 1:
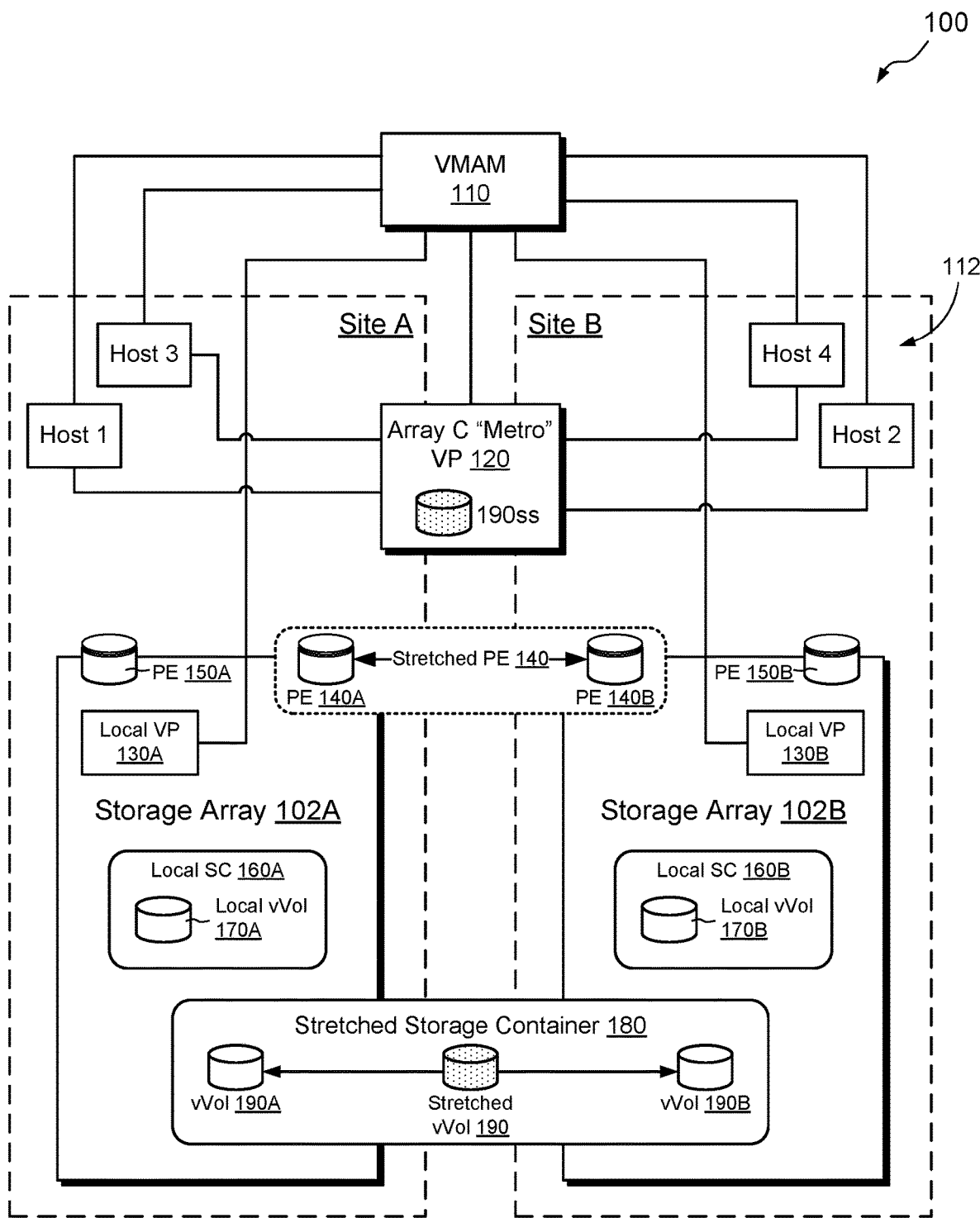
FIG. 1 is a block diagram of an example environment in which embodiments of the improved technique can be practiced.

FIG. 1 shows an example environment 100 in which embodiments of the improved technique can be practiced. Here, a first array 102A operates at Site A and a second array 102B operates at Site B. Each array 102 may include one or more storage computing nodes as well as persistent storage, such as magnetic disk drives, solid state drives, and/or other types of storage drives. Site A and Site B may be located in different data centers, different rooms within a data center, different locations within a single room, different buildings, or the like. Site A and Site B may be geographically separate but are not required to be. Generally, to meet customary metro cluster requirements, Site A and Site B may be separated by no more than 100 km.

Each array 102 is capable of hosting data objects, and such data objects may include virtual volumes, such as vVols. Although the focus of the depicted examples is on vVols and VMware technology, embodiments are not limited to VMware's version of virtual volumes or to VMware technology. Rather, embodiments may include any virtual machine volumes that are individually manageable by a storage array and to any virtual machine management infrastructure.

As further shown, environment 100 includes a virtual machine administrative manager (VMAM) 110, which in VMware technology may be provided as vCenter. Embodiments are not limited to vCenter, however. The VMAM 110 may manage virtual machines and their virtual volumes in the environment 100. For example, VMAM 110 may be configured to create virtual volumes, change their parameters, and report on their size, location, and other characteristics. In an example, VMAM 110 recognizes single-site virtual volumes, i.e., virtual volumes that exist as individual entities on respective arrays, but VMAM does not recognize stretched virtual volumes, i.e., virtual volumes deployed in metro-cluster arrangements.

Environment 110 further includes hosts 112. Any number of hosts 112 (e.g., Host 1, Host 2, Host 3, and Host 4) may be provided, and such hosts may be configured to run virtual machines, which are subject to administration and control by VMAM 110. In an example, the virtual machines running on hosts 112 are configured with access to their respective virtual volumes (e.g., as virtual disk drives of the virtual machines) from one or both arrays 102. In a VMware environment, hosts 112 may be configured as ESXi hosts, for example. Hosts 112 may connect to arrays 102 and VMAM 110 via a network (not shown), such as a storage area network (SAN), a local area network (LAN), a wide area network (WAN), the Internet, and/or some other type of network or combination of networks, for example.

Given that VMAM 110 does not natively support virtual volumes in a metro-cluster arrangement, new developments are needed if this functionality is to be achieved. Improvements hereof address this need at least in part by impersonating an array (e.g., Array C) that presents single-site virtual volumes, which the VMAM 110 can support, while internally mapping such single-site virtual volumes, which exist only virtually, to pairs of actual virtual volumes configured as metro-cluster stretched virtual volumes. The VMAM 110 can proceed as if it is managing single-site virtual volumes, with no awareness that the single-site volumes are actually implemented at the storage level as metro-cluster pairs.

To this end, environment 100 may include a metro virtual provider (metro VP) 120. Metro VP 120 presents itself as belonging to a third array (e.g., Array C), which exists only virtually. Array C is not a physical array, but metro VP 120 nevertheless presents Array C as the host of stretched virtual volumes in the environment 100. For example, metro VP 120 may present a single-site virtual volume 190*ss* to VMAM 110, while arrays 102 transform virtual volume 190*ss* into a stretched virtual volume 190, which is formed from actual virtual volume 190A on Array A and actual virtual volume 190B on Array B.

Metro VP 120 may be implemented in a variety of ways. In one example, metro VP 120 runs on a computer separate from Array 102A and Array 102B. Preferably, however, metro VP 120 runs on a storage node on one or both arrays. In an example, metro VP 120 is configured with settings that identify metro VP 120 as part of Array C, rather than as part of Array 102A or Array 102B.

Assuming that metro VP 120 is dedicated to stretched virtual volumes, local virtual providers (VPs) 130A and 130B may be provided for managing un-stretched virtual volumes local to arrays 102A and 102B, respectively. For example, local VP 130A manages local virtual volume 170A and local VP 130B manages local virtual volume 170B. These local VPs 130A and 130B are each configured to communicate with VMAM 110 and to act as local points of management and control for any local (un-stretched) virtual volumes.

Management of virtual volumes may require the use of storage containers implemented on arrays. For example, VMware prescribes storage containers as necessary components for implementing vVols on storage arrays. Each storage container has an associated identifier.

To further promote metro-cluster functionality, arrays 102 may implement a stretched storage container 180. In an example, the stretched storage container 180 is realized by creating one storage container on Array 102A, creating another storage container on Array 102B, and giving both storage containers the same identifier. The two storage containers of the stretched container 180 thus appear to metro VP 120 to be a single storage container, which metro VP 120 may present as belonging to Array C.

In some examples, local storage containers are also provided for managing un-stretched virtual volumes on each array 102. For example, local storage container 160A on Array 102A may be provided for storing local virtual volume 170A (and any other local virtual volumes). Likewise, local storage container 160B on Array 102B may be provided for storing local virtual volume 170B (and any other local virtual volumes local to Array 102B). Each array may include any number of such local storage containers.

In an example, metro VP 120 is configured to access virtual volumes from the stretched storage container 180, but not from any local storage containers (e.g., 160A or 160B). Likewise, local VPs 130A and 130B may be configured to access local virtual volumes from local storage containers, but not from the stretched storage container 180. In some examples, multiple stretched storage containers 180 may be provided. In such cases, metro VP 120 may be configured to access virtual volumes from any of them.

To support host access to virtual volumes, each virtual volume may be bound to one or more protocol endpoints (PEs). As is known, PEs are administrative LUNs that provide hosts with access to storage objects. Any number of virtual volumes in an array may bind to a PE, which may provide host access to such virtual volumes by a single host or by multiple hosts (depending on implementation). In the example shown, virtual volume 190A is bound to PE 140A and virtual volume 190B is bound to PE 140B. Also, local virtual volume 170A is bound to PE 150A and local virtual volume 170B is bound to PE 150B.

In some examples, metro-cluster functionality is still further promoted by providing a stretched PE. For example, PE 140A and PE 140B may be configured to form a stretched PE 140, which may be realized, for example, by providing PEs 140A and 140B with a common identifier, such as a common SCSI identifier (SCSI is an acronym for Small Computer System Interface). Thus, for example, a host 112 may be configured with access to the stretched virtual volume 190 via either PE 140A or PE 140B, using the same identifier. Indeed, the host 112 need not have any awareness of which side of virtual volume 190 (i.e., 190A or 190B) the host is accessing.

Stretched PEs are specific to certain embodiments, such as those involving uniform host connectivity. They are not required in all embodiments, however. For example, stretched PEs are not required for supporting non-uniform host connectivity. These examples will be described more fully in connection with FIGS. 2 and 3.

Regardless of whether stretched PEs are provided, embodiments preferably implement both sides of a stretched virtual volume with a common identifier. For example, both virtual volume 190*a* and virtual volume 190*b* have the same identifier. In VMware implementations, the common identifier may be a common VASA identifier. VASA is an acronym for "vStorage APIs (Application Programming Interface) for Storage Awareness (computing)." In other virtual-machine environments, the common identifier may be one assigned by that environment. The two sides of the stretched virtual volume may also share a common SCSI identifier, as well as a common NAA (Network Addressing Authority) identifier.

In example operation, a virtual machine administrator accesses the VMAM 110, e.g., from an administrative computer. The administrator may operate the VMAM 110 (e.g., via a graphical user interface, command line interface, or the like) to issue a command to create a new virtual volume. For example, the administrator may select storage container 180, with the understanding that creating a virtual volume in storage container 180 causes a stretched virtual volume to be created across arrays 102. In an example, the command to create the new virtual volume is part of a larger task of creating a new virtual machine, but this is not required.

Metro VP 120 is informed of the command and responds by initiating creation of the new stretched virtual volume. It is assumed for illustration that the new stretched virtual volume to be created is virtual volume 190. In an example, metro VP 120 coordinates with Array 102A to create a new virtual volume 190*a* in the portion of stretched container 180 on Array 102A. In an example, the act of creating a new virtual volume in container 180 automatically causes the arrays 102A and 102B to make the new virtual volume a stretched virtual volume 190. For example, Array 102B creates actual virtual volume 190B with the same identifiers as were used in virtual volume 190A. Note that the order of creation of actual virtual volumes 190A and 190B may be varied. For example, virtual volume 190A may be created first, virtual volume 190B may be created first, or both may be created at the same time in parallel.

Metro VP 120 may direct the binding of one or both actual virtual volumes 190A and/or 190B to one or more PEs (such as PEs 140A and/or 140B). In an example, binding a virtual volume in the stretched container 180 automatically configures bi-directional replication (mirroring) between the two sides. Bi-direction mirroring is thus established between virtual volumes 190A and 190B. Such mirroring ensures data consistency between volumes 190A and 190B. The stretched virtual volume 190 is thus realized.

Over time, the administrator may issue additional commands to the new virtual volume. For example, such commands may specify a resizing or deletion of the stretched virtual volume. In responding to such commands, metro VP 120 ensures that the commands are mirrored to both sides and performed on the respective actual virtual volumes simultaneously.

Figure 2:
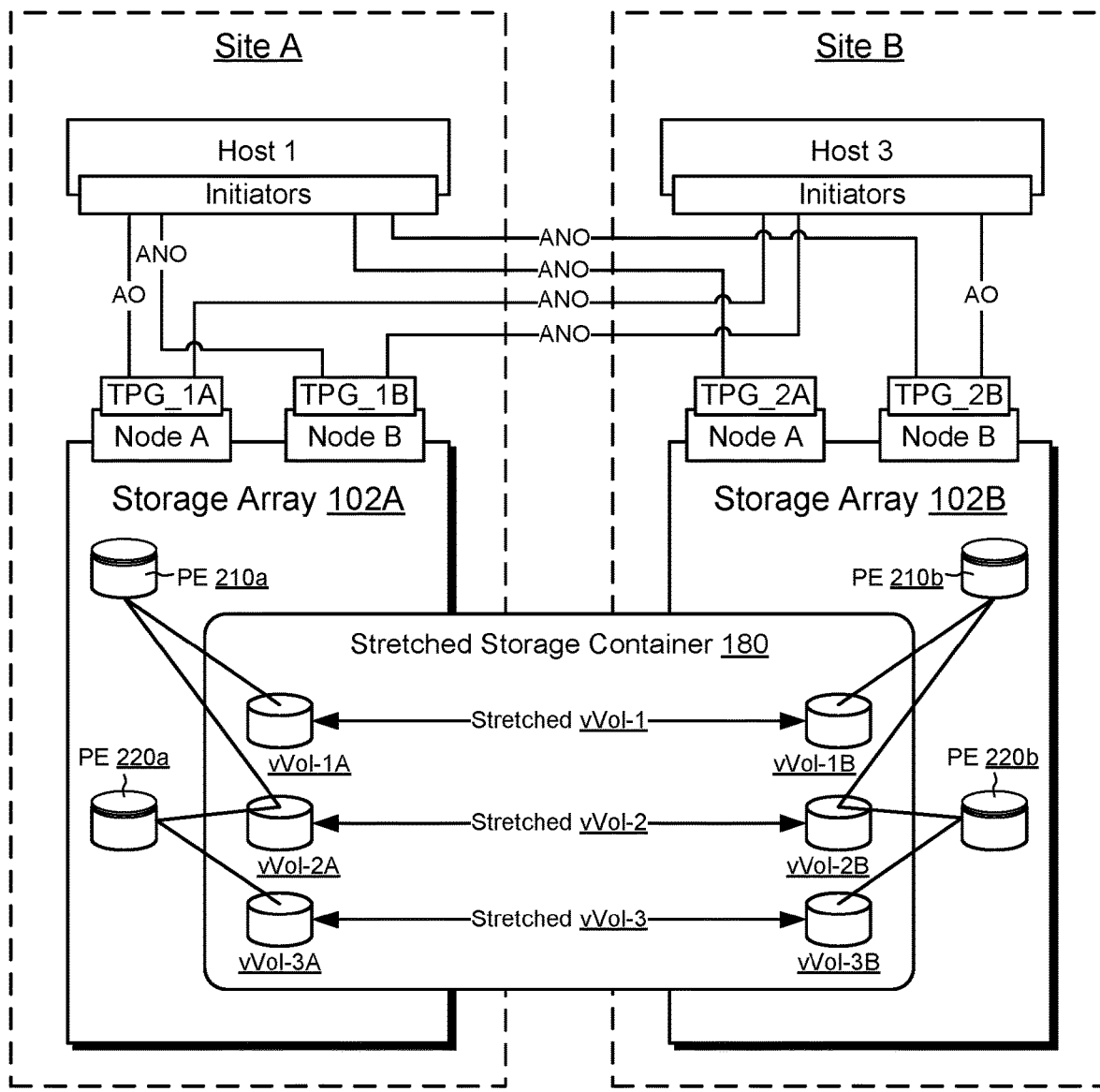
FIG. 2 is a block diagram showing the arrangement of FIG. 1 configured for uniform host connectivity.

FIG. 2 shows an example arrangement in which stretched virtual volumes are configured for uniform host connectivity. With uniform host connectivity, one or more hosts 112 have access to both actual virtual volumes of a stretched virtual volume in the respective arrays. In the example shown, vVol-1A and vVol-2A are both bound to PE 210*a* in Array 102A.

vVol-2A and vVol-3A are both bound to PE 220*a* in Array 102A.

vVol-1B and vVol-2B are both bound to PE 210*b* in Array 102B.

vVol-2B and vVol-3B are both bound to PE 220*b* in Array 102B.

As virtual volumes vVol-1A, vVol-1B, vVol-2A, vVol-2B, vVol-3A, and vVol-3B are all located in the stretched storage container 180, stretched virtual volumes vVol-1, vVol-2, and vVol-3 are thereby formed. vVol-1A and vVol-1B share a first identifier, vVol-2A and vVol-2B share a second identifier, and vVol-3A and vVol-3B share a third identifier. Also, PE 210*a* shares the same identifier with PE 210*b*, and PE 220*a* shares the same identifier with PE 220*b*.

With the depicted arrangement (and assuming connection paths are properly enabled), hosts 112 can access stretched vVol-1 via both PE 210*a* on Array 102A and PE 210*b* on Array 102B. Likewise, hosts 112 can access stretched vVol-3 via both PE 220*a* on Array 102A and PE 220*b* on Array 102B. Host access to vVol-2 is even more flexible, as it may be achieved via any of PE 210*a*, PE220*a*, PE210*b*, and PE 220*b*.

Although the FIG. 2 arrangement appears to be symmetrical, connection preferences may optionally be encoded into connection paths that run between hosts 112 and arrays 102, e.g., by establishing ALUA port settings. Such preferences may be based on observed latency, for example. ALUA is an acronym for Asymmetric Logical Unit Access, and ALUA port settings may include active/optimized (AO) and active/non-optimized (ANO). In general, a path between a host initiator and an array target may be assigned AO status if it has low latency, or it may be assigned ANO status if it has higher latency. Example ALUA settings for various paths are shown. In a typical arrangement, one side of a stretched virtual volume is exposed to a host as AO, whereas the other side of the same stretched volume is exposed to the same host as ANO, thus establishing a preferred path. Although ALUA settings may establish preferred paths between hosts and virtual volumes, they are used as optimizations rather than as ways of determining connectivity.

In the FIG. 2 arrangement, arrays 102 may cooperate to:

Expose the same SCSI identity for both sides of each stretched vVol, including NAA ID and Subordinate LUN ID under the respective PE's Administrative LUN.

Comply with SCSI semantics resolving overlapping conflicting write I/O.

Comply with SCSI semantics resolving SCSI command failures.

Comply with SCSI semantics handling reservations. Both SCSI-2 and SCSI-3 persistent reservations.

Figure 3:
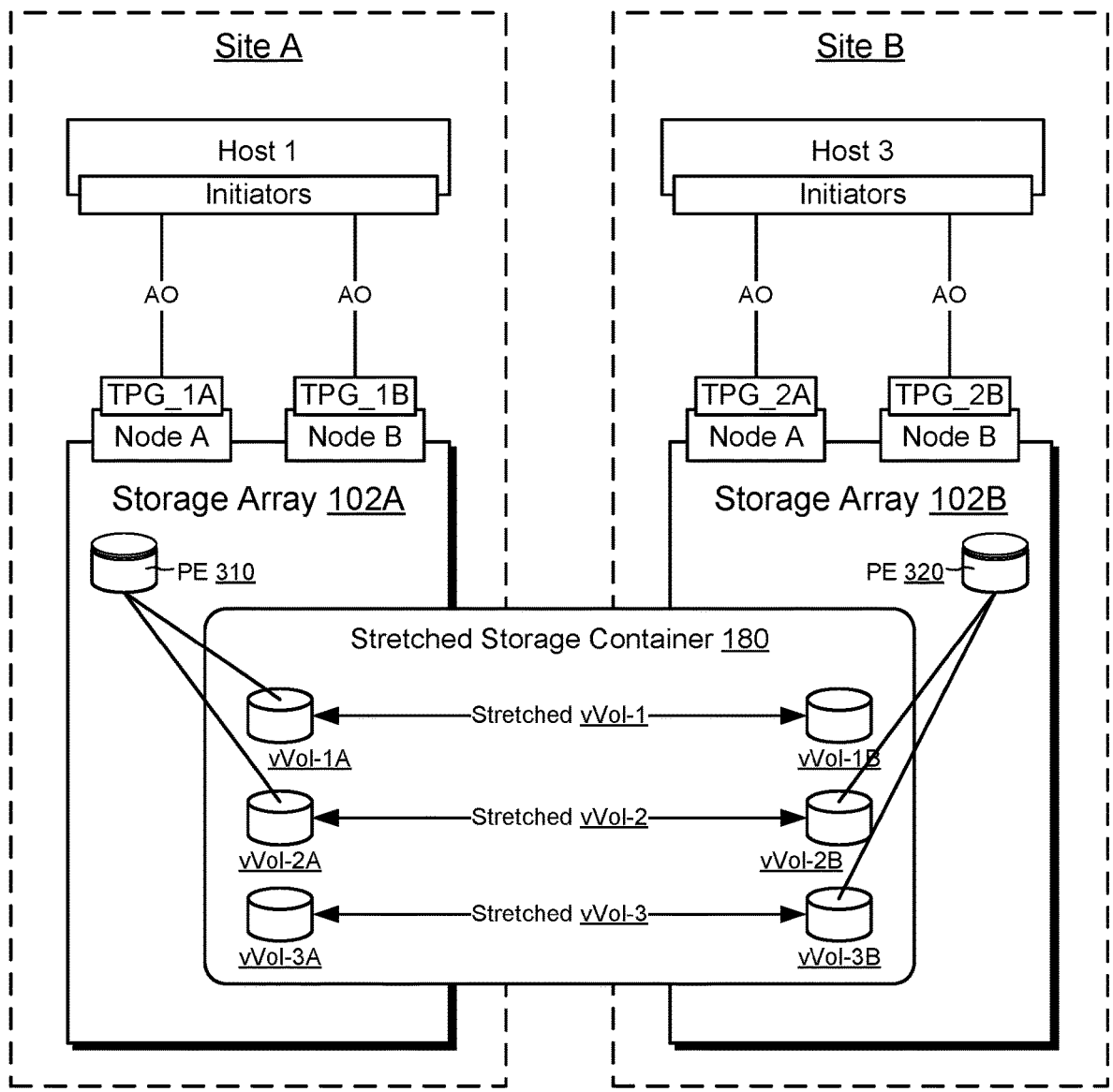
FIG. 3 is a block diagram showing the arrangement of FIG. 1 configured for non-uniform host connectivity.

FIG. 3 shows an example arrangement in which stretched virtual volumes are configured for non-uniform host connectivity. With non-uniform host connectivity, a host may have access to one side of stretched virtual volume on Array 102A but not have access to the other side of the same stretched virtual volume in the Array 102B.

As shown in FIG. 3, vVol-1A and vVol-2A are both bound to PE 310 in Array 102A. However, vVol-3A is not bound to any PE. In Array 102B, vVol-2B and vVol-3B are both bound to PE 320, but vVol-1B is not bound to any PE. Three stretched virtual volumes vVol-1, vVol-2, and vVol-3 are formed, but vVol-1 is accessible only via PE 310 in Array 102A. Also, vVol-3 is accessible only via PE 320 in Array 102B. vVol-2 is accessible from both arrays, but via respective PEs 310 and 320.

Unlike in the uniform connectivity example, PEs 310 and 320 do not share the same identifier. Therefore, a host 112 with access to vVol-2A via PE 310 in Array 102A does not automatically have access to vVol-2B via PE 320 in Array 102B. Nevertheless, the stretched vVols (vVol-1, vVol-2, and vVol-3) are each maintained as replicated pairs, with writes to each side mirrored to the other side. If only one side receives writes, as with vVol-1 and vVol-3, all writes to that one side are replicated to the other side. In addition, the vVols on both sides of each pair share the same identifier (e.g., the same VASA ID and SCSI ID).

In the FIG. 3 arrangement, arrays 102 may cooperate to:

Expose the same SCSI identity for both sides of each stretched vVol, including NAA ID.

Comply with SCSI semantics resolving overlapping conflicting write I/O.

Comply with SCSI semantics resolving SCSI command failures.

Comply with SCSI semantics handling reservations. Both SCSI-2 and SCSI-3 persistent reservations.

Figure 4:
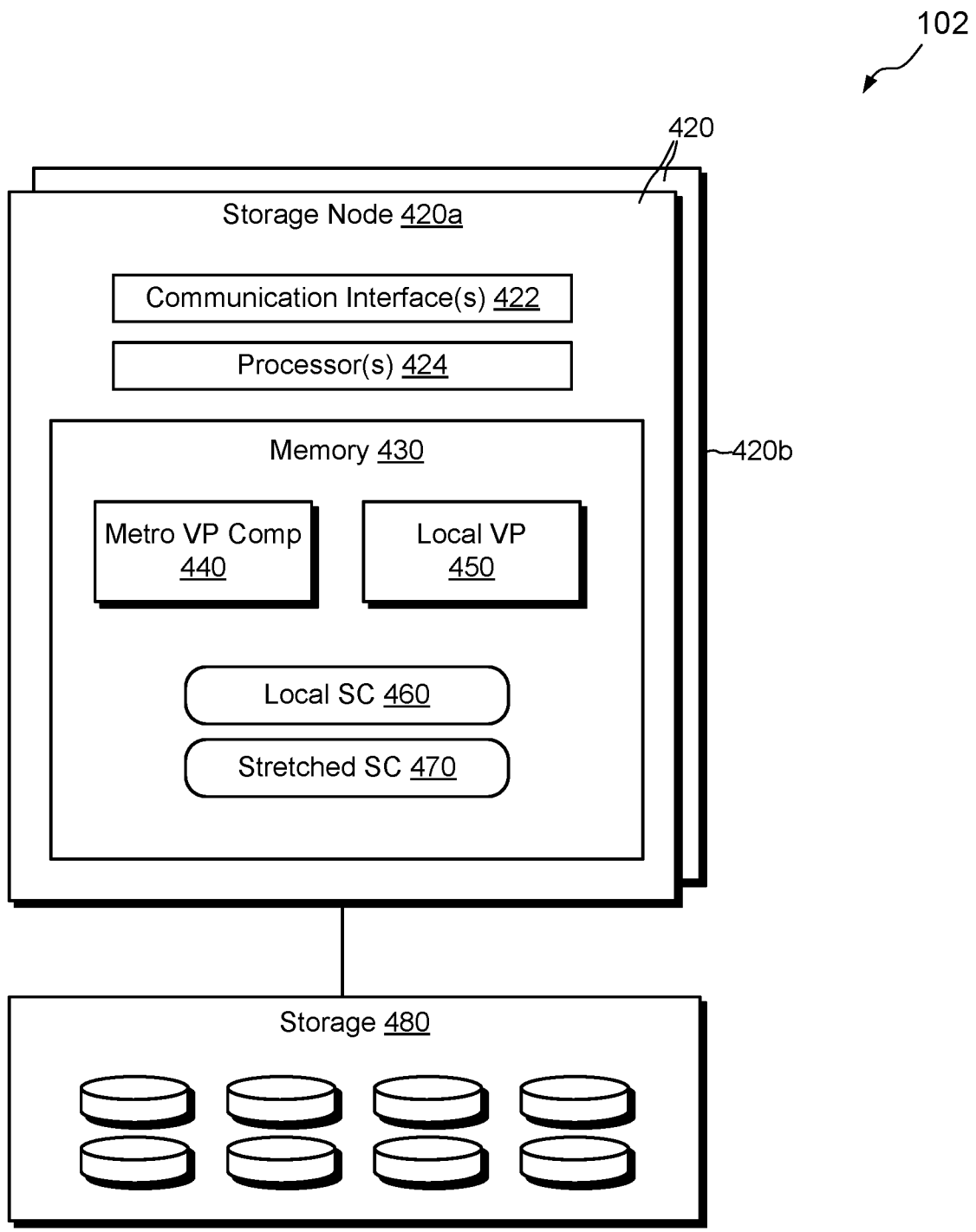
FIG. 4 is a block diagram of an example storage array.

FIG. 4 shows an example arrangement of a storage array 102 in greater detail. Array 102 is intended to be representative of Array 102A and Array 102B; however, there is no requirement that the two arrays 102A and 102B be identical.

Array 102 is seen to include a pair of storage nodes 420 (i.e., 420*a* and 420*b*; also called storage processors, or "SPs"), as well as storage 480, such as magnetic disk drives, electronic flash drives, and/or the like. Nodes 420 may be provided as circuit board assemblies or blades, which plug into a chassis that encloses and cools the nodes 420. The chassis has a backplane or midplane for interconnecting the nodes, and additional connections may be made among nodes using cables. In some examples, nodes 420 are part of a storage cluster, such as one which contains any number of storage appliances, where each appliance includes a pair of nodes 420 connected to shared storage devices. No particular hardware configuration is required, however.

As shown, node 420*a* includes one or more communication interfaces 422, a set of processors 424, and memory 430. The communication interfaces 422 include, for example, SCSI target adapters and/or network interface adapters for converting electronic and/or optical signals received over a network to electronic form for use by the node 420*a*. The set of processors 424 includes one or more processing chips and/or assemblies, such as numerous multi-core CPUs (central processing units). The memory 430 includes both volatile memory, e.g., RAM (Random Access Memory), and non-volatile memory, such as one or more ROMs (Read-Only Memories), disk drives, solid state drives, and the like. The set of processors 424 and the memory 430 together form control circuitry, which is constructed and arranged to carry out various methods and functions as described herein. Also, the memory 430 includes a variety of software constructs realized in the form of executable instructions. When the executable instructions are run by the set of processors 424, the set of processors 424 is made to carry out the operations of the software constructs. Although certain software constructs are specifically shown and described, it is understood that the memory 430 typically includes many other software components, which are not shown, such as an operating system, various applications, processes, and daemons.

As further shown in FIG. 4, the memory 430 "includes," i.e., realizes by execution of software instructions, a metro VP component 440, a local VP 450, a local storage container 460, and a local component 470 of the stretched storage container 180 (FIG. 1). In an example, the metro VP component 440 depicts a case where the metro VP 120 of FIG. 1 runs locally on an array. In some examples, each node 420 runs its own instance of the metro VP component 440, with the various instances maintaining synchronization with one another to act as a single entity. In other examples, a single node 420 in the array 102 runs the metro VP component 440 on behalf of the entire array.

Local VP 450 is an example of local VPs 130A and 130B as shown in FIG. 1, with each local VP 450 participating in administration and control of non-stretched virtual volumes of the array 102. Local SC 460 is a local storage container, similar to storage containers 160A and 160B, and stretched SC 470 is a local component of stretched storage container 180, such as component 180*a* or 180*b*. Although each of components 440, 450, 460, and 470 are shown in FIG. 1, they are shown again here to illustrate their particular placement in memory 430 of storage node 420. One should appreciate that storage node 420*a* is intended to be representative of both storage nodes 420*a* and 420*b*.

Figure 5:
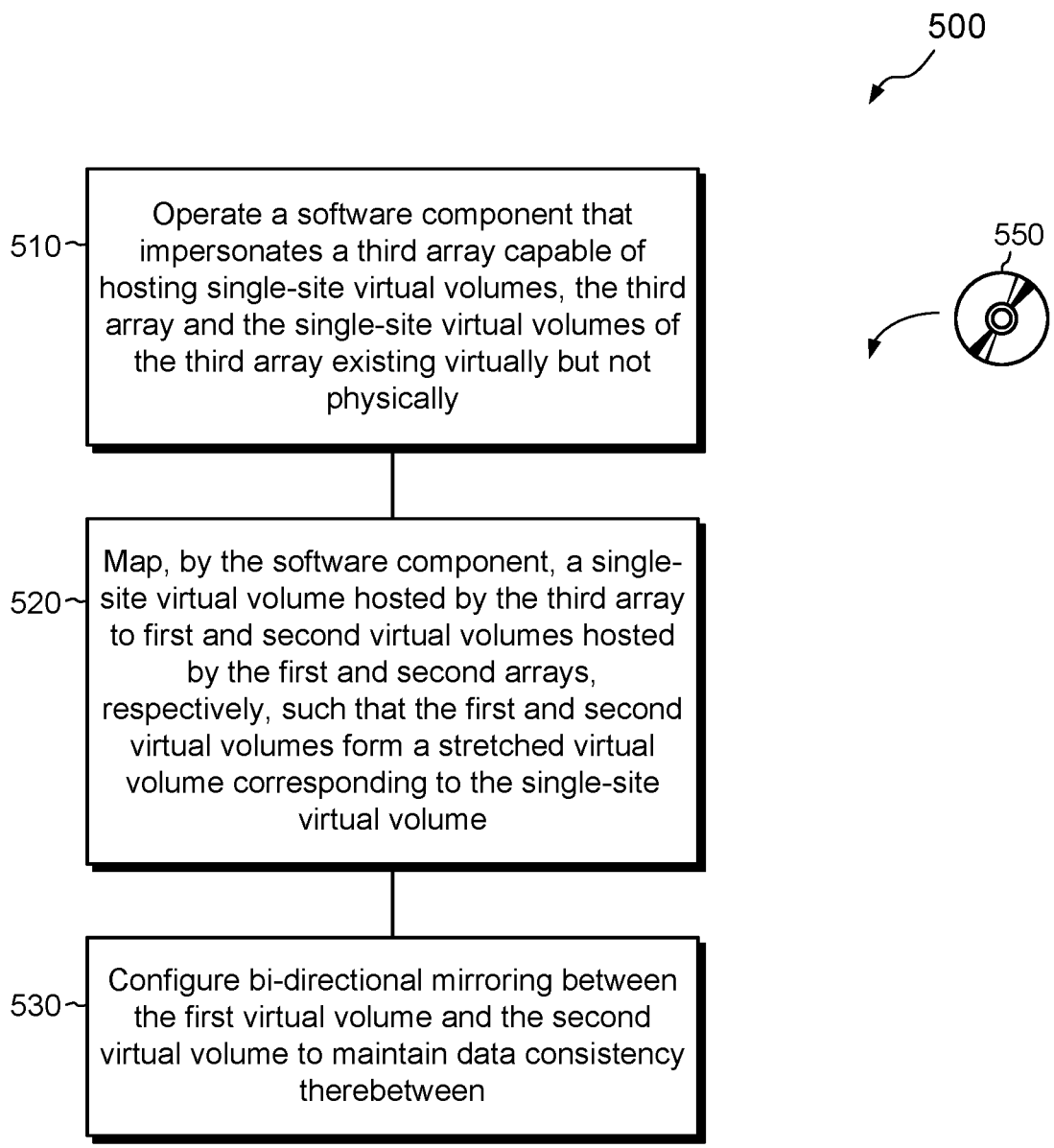
FIG. 5 is a flowchart showing an example method of deploying virtual volumes in a metro cluster.

FIG. 5 shows an example method 500 that may be carried out in connection with the environment 100. The method 500 is typically performed, for example, by the software constructs described in connection with FIGS. 1 and 4, which reside in the memory 430 of one or more processing nodes 420 and are run by one or more sets of processors 424. The various acts of method 500 may be ordered in any suitable way. Accordingly, embodiments may be constructed in which acts are performed in orders different from that illustrated, which may include performing some acts simultaneously.

At 510, a software component, such as metro VP 120, is operated that impersonates a third array (e.g., Array C) for hosting single-site virtual volumes. The third array and the single-site virtual volumes of the third array exist virtually but not physically. The software component may be realized as any software construct, such as a provider, an agent, an API (Application Program Interface), a program, an application, a process, a function, a subroutine, or the like, or any combination thereof.

At 520, a single-site virtual volume 190*ss* hosted by the third array is transformed, by the software component 120, to first and second virtual volumes, e.g., 190A and 190B, which are hosted by first and second arrays 102A and 102B, respectively, such that the first and second virtual volumes 190A and 190B form a stretched virtual volume 190 corresponding to the single-site virtual volume 190*ss*.

At 530, mirroring is configured between the first virtual volume 190A and the second virtual volume 190B to maintain data consistency therebetween. The mirroring may be bi-directional, e.g., in cases where host access is provided to both virtual volumes 190A and 190B, or it may be unidirectional, e.g., in cases where host access is provided to only one of virtual volumes 190A and 190B but not the other.

An improved technique has been described for deploying virtual volumes in a metro cluster across first and second arrays 102. The technique includes impersonating a third array (Array C) that purports to host single-site virtual volumes. The technique further includes mapping the single-site virtual volumes purportedly hosted by the third array to respective pairs of actual virtual volumes. Each pair includes a first virtual volume (e.g., 190A) in the first array 102A and a second virtual volume (e.g., 190B) in the second array 102B and realizes a stretched virtual volume (e.g., 190), with writes being mirrored between the virtual volumes of each pair. Metro clustering of virtual volumes is thus achieved, with the associated benefits, such as increased data availability, disaster avoidance, resource balancing, and storage migration.

Having described certain embodiments, numerous alternative embodiments or variations can be made. Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 550 in FIG. 5). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of deploying virtual volumes in a metro cluster involving a first array and a second array, comprising:
    operating a software component that impersonates a third array for hosting single-site virtual volumes, the third array and the single-site virtual volumes of the third array existing virtually as constructions of the software component but not physically;
    transforming, by the software component, a single-site virtual volume hosted by the third array to first and second virtual volumes hosted by the first and second arrays, respectively, such that the first and second virtual volumes form a stretched virtual volume corresponding to the single-site virtual volume; and
    configuring mirroring between the first virtual volume and the second virtual volume to maintain data consistency therebetween,
    wherein the method further comprises operating a VMAM (virtual machine administrative manager) that recognizes single-site virtual volumes but does not recognize stretched virtual volumes, and administering the single-site virtual volume that corresponds to the stretched virtual volume using the VMAM.

2. The method of claim 1, wherein the software component is operatively coupled to the VMAM configured to administer single-site virtual volumes, wherein the VMAM is configured to administer the single-site virtual volume hosted by the third array and one or more virtual machines stored therein, and wherein the method further comprises mapping a command from the VMAM pertaining to the single-site virtual volume to corresponding instructions pertaining to the first and second virtual volumes.

3. The method of claim 2, further comprising creating a stretched storage container that spans between the first array and the second array, the stretched storage container including a first storage container operating in the first array and a second storage container operating in the second array, the first storage container and the second storage container having a common identifier.

4. The method of claim 3 wherein, in response to creating a new virtual volume in the stretched container, the method further comprises implementing the new virtual volume as a stretched virtual volume having a first instance in the first array and a second instance in the second array.

5. The method of claim 4, wherein creating the new virtual volume is performed in response to the software component receiving a command from the VMAM to create a new virtual volume.

6. The method of claim 4, wherein creating the new virtual volume in the stretched container includes configuring the first instance in the first array and the second instance in the second array with a common virtual-volume identifier, such that the first instance and the second instance share the same virtual-volume identifier.

7. The method of claim 4 wherein, in response to creating another virtual volume outside the stretched container, the method further comprises implementing the other virtual volume as an un-stretched virtual volume that exists in only one of the first array or the second array.

8. The method of claim 1, wherein the first and second virtual volumes are deployed with uniform host connectivity, such that a host has access to both virtual volumes of the stretched virtual volume in the respective arrays.

9. The method of claim 8, further comprising:
    establishing a first protocol endpoint (PE) in the first array for enabling host access to the first virtual volume;
    establishing a second PE in the second array for enabling host access to the second virtual volume; and
    providing a shared identifier for both the first PE and the second PE, such that the first PE and the second PE form a stretched PE that appears as a single PE to hosts.

10. The method of claim 9, further comprising:
    the first array exposing the stretched PE to the host as ALUA (Asymmetric Logical Unit Access) active optimized; and
    the second array exposing the stretched PE to the host as ALUA active non-optimized.

11. The method of claim 1, wherein the first and second virtual volumes are deployed with non-uniform host connectivity, such that a host has access to the first virtual volume in the first array but not to the second virtual volume in the second array.

12. The method of claim 11, further comprising:
    binding the first virtual volume in the first array to a first protocol endpoint (PE);
    binding the second virtual volume in the second array to a second PE; and
    providing the first PE and the second PE with respective identifiers that are different from each other.

13. A method of deploying virtual volumes in a metro cluster involving a first array and a second array, comprising:
    forming a stretched storage container between the first array and the second array at least in part by assigning a first common identifier to both a first storage container in the first array and a second storage container in the second array;
    forming a stretched virtual volume in the stretched storage container between the first array and the second array at least in part by assigning a second common identifier to both a first virtual volume in the first storage container and a second virtual volume in the second storage container;
    operating a software component that impersonates a third array for hosting single-site virtual volumes, the third array and the single-site virtual volumes of the third array existing virtually as constructions of the software component but not physically; and exposing the first virtual volume and the second virtual volume of the stretched virtual volume via respective protocol endpoints to one or more hosts,
wherein the method further comprises operating a VMAM (virtual machine administrative manager) that recognizes single-site virtual volumes but does not recognize stretched virtual volumes, and administering a single-site virtual volume that corresponds to the stretched virtual volume using the VMAM.

14. A computer program product including a set of non-transitory, computer-readable media having instructions which, when executed by control circuitry of a computerized apparatus, cause the computerized apparatus to perform a method of deploying virtual volumes in a metro cluster involving a first array and a second array, the method comprising:
operating a software component that impersonates a third array for hosting single-site virtual volumes, the third array and the single-site virtual volumes of the third array existing virtually as constructions of the software component but not physically;
transforming, by the software component, a single-site virtual volume hosted by the third array to first and second virtual volumes hosted by the first and second arrays, respectively, such that the first and second virtual volumes form a stretched virtual volume corresponding to the single-site virtual volume; and
configuring mirroring between the first virtual volume and the second virtual volume to maintain data consistency therebetween,
wherein the method further comprises operating a VMAM (virtual machine administrative manager) that recognizes single-site virtual volumes but does not recognize stretched virtual volumes, and administering the single-site virtual volume that corresponds to the stretched virtual volume using the VMAM.

15. The computer program product of claim 14, wherein the first and second virtual volumes are deployed with uniform host connectivity, such that a host has access to both virtual volumes of the stretched virtual volume in the respective arrays.

16. The computer program product of claim 15, wherein the method further comprises:
establishing a first protocol endpoint (PE) in the first array for enabling host access to the first virtual volume;
establishing a second PE in the second array for enabling host access to the second virtual volume; and
providing a shared identifier for both the first PE and the second PE, such that the first PE and the second PE for a stretched PE that appears as a single PE to hosts.

17. The computer program product of claim 16, wherein the method further comprises:
the first array exposing the stretched PE to the host as ALUA (Asymmetric Logical Unit Access) active optimized ; and
the second array exposing the stretched PE to the host as ALUA active non-optimized.

18. The computer program product of claim 14, wherein the first and second virtual volumes are deployed with non-uniform host connectivity, such that a host has access to the first virtual volume in the first array but not to the second virtual volume in the second array.

19. The computer program product of claim 18, wherein the method further comprises:
binding the first virtual volume in the first array to a first protocol endpoint (PE);
binding the second virtual volume in the second array to a second PE; and
providing the first PE and the second PE with respective identifiers that are different from each other.

20. The computer program product of claim 14, wherein the method further comprises creating a stretched storage container that spans between the first array and the second array, the stretched storage container including a first storage container operating in the first array and a second storage container operating in the second array, the first storage container and the second storage container having a common identifier.

21. The method of claim 1, wherein the stretched virtual volume provides a virtual machine disk of a virtual machine, the virtual machine disk being individually manageable by a data storage system.

22. The method of claim 1, wherein operating the software component that impersonates the third array includes:
running a first instance of the software component on a storage processor of the first array; and
running a second instance of the software component on a storage processor of the second array.

* * * * *